(12) United States Patent
Momoshima et al.

(10) Patent No.: US 12,100,302 B2
(45) Date of Patent: Sep. 24, 2024

(54) AUTOMATED VALET PARKING MANAGEMENT SYSTEM AND AUTOMATED VALET PARKING MANAGEMENT METHOD

(71) Applicant: TOYOTA JIDOSHA KABUSHIKI KAISHA, Toyota (JP)

(72) Inventors: Shogo Momoshima, Nagoya (JP); Ryuji Okamura, Gotemba (JP); Tetsushi Okamoto, Miyoshi (JP); Daiki Kaneichi, Tokyo (JP); Minoru Nakadori, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 273 days.

(21) Appl. No.: 17/743,587

(22) Filed: May 13, 2022

(65) Prior Publication Data
US 2022/0392349 A1    Dec. 8, 2022

(30) Foreign Application Priority Data

Jun. 4, 2021 (JP) ................................. 2021-094361

(51) Int. Cl.
*B60W 30/06*    (2006.01)
*B60W 60/00*    (2020.01)
(Continued)

(52) U.S. Cl.
CPC ............. *G08G 1/202* (2013.01); *B60W 30/06* (2013.01); *B60W 60/00253* (2020.02);
(Continued)

(58) Field of Classification Search
CPC ........ G08G 1/202; G08G 1/207; G08G 1/144; G08G 1/148; G08G 1/096708;
(Continued)

(56) References Cited

U.S. PATENT DOCUMENTS

2016/0116293 A1* 4/2016 Grover .................. G08G 1/005
                                                                701/23
2018/0315022 A1   11/2018 Yamamoto et al.
(Continued)

FOREIGN PATENT DOCUMENTS

JP    2018-185693 A    11/2018
JP    2019-128659 A    8/2019
(Continued)

*Primary Examiner* — Michael V Kerrigan
(74) *Attorney, Agent, or Firm* — Sughrue Mion, PLLC

(57) ABSTRACT

An automated valet parking (AVP) management system manages an AVP service delivered in a predetermined area. A pick-up or drop-off point is away from a parking facility in which a vehicle is parked. When it is not possible to deliver the AVP service to a user in accordance with a user request, notification information is delivered to the user. The notification information includes at least one of: a congestion situation on a route from a current position of the vehicle to a specified pick-up or drop-off point; a congestion situation at the specified pick-up or drop-off point; a waiting time for the user to get on or off the vehicle at the specified pick-up or drop-off point; a recommended time of day of use at the specified pick-up or drop-off point; and a substitute pick-up or drop-off point being a substitute for the specified pick-up or drop-off point.

5 Claims, 16 Drawing Sheets

(51) Int. Cl.
  *G06Q 10/02*    (2012.01)
  *G06Q 10/0631*  (2023.01)
  *G06Q 50/40*    (2024.01)
  *G08G 1/00*     (2006.01)

(52) U.S. Cl.
  CPC ....... *G06Q 10/02* (2013.01); *G06Q 10/06314* (2013.01); *G06Q 10/06315* (2013.01); *G06Q 50/40* (2024.01); *G08G 1/207* (2013.01); *B60W 2540/041* (2020.02)

(58) Field of Classification Search
  CPC ............ G08G 1/096805; B60W 30/06; B60W 60/00253; B60W 2540/041; G06Q 10/02; G06Q 10/06314; G06Q 10/06315; G06Q 50/40; B62D 15/0285
  See application file for complete search history.

(56) References Cited

U.S. PATENT DOCUMENTS

| | | |
|---|---|---|
| 2019/0228664 A1 | 7/2019  | Seki |
| 2020/0150657 A1 | 5/2020  | Yoo |
| 2020/0307648 A1 | 10/2020 | Noguchi et al. |
| 2020/0361450 A1 | 11/2020 | Noguchi et al. |
| 2021/0150422 A1 | 5/2021  | Takato |

FOREIGN PATENT DOCUMENTS

| | | |
|---|---|---|
| JP | 2020-075718 A | 5/2020 |
| JP | 2020-166631 A | 10/2020 |
| JP | 2020-166767 A | 10/2020 |
| JP | 2020187695 A  | 11/2020 |

\* cited by examiner

FIG. 3

<SCHEDULE INFORMATION>

| USER | PICK-UP/DROP-OFF | DATE AND TIME | PICK-UP OR DROP-OFF POINT | VEHICLE | PARKING FACILITY |
|---|---|---|---|---|---|
| | | | | | |
| | | | | | |
| | | | | | |
| | | | | | |

<CONGESTION SITUATION INFORMATION>

AUTOMATED VALET PARKING MANAGEMENT SYSTEM AND AUTOMATED VALET PARKING MANAGEMENT METHOD

CROSS-REFERENCE TO RELATED APPLICATION

This application claims priority to Japanese Patent Application No. 2021-094361 filed on Jun. 4, 2021, the entire contents of which are incorporated by reference herein.

BACKGROUND

Technical Field

The present disclosure relates to a technique for managing an automated valet parking service delivered in a predetermined area.

Background Art

Patent Literature 1 and Patent Literature 2 disclose techniques related to an automated valet parking (AVP: Automated Valet Parking) within a parking facility. A vehicle supporting the automated valet parking is capable of autonomously traveling in the parking facility. A user gets off the vehicle or gets on the vehicle at a pick-up or drop-off space provided in the parking facility. The vehicle autonomously travels between the pick-up or drop-off space and an allocated parking space. That is, the vehicle automatically executes an entry process and an exit process.

LIST OF RELATED ART

Patent Literature 1: Japanese Laid-Open Patent Application Publication No. JP-2020-166767
Patent Literature 2: Japanese Laid-Open Patent Application Publication No. JP-2020-166631

SUMMARY

Delivering an automated valet parking service in a large area to some extent such as a city is considered. In that case, a situation where a pick-up or drop-off point at which a user of the automated valet parking service gets on a vehicle or gets off a vehicle is away from a parking facility to some extent is conceivable. Therefore, there may be a case where the automated valet parking service desired by the user cannot be delivered as desired, depending on a congestion situation and the like in the area.

An object of the present disclosure is to provide a technique that can improve convenience of an automated valet parking service delivered in a predetermined area.

A first aspect is directed to an automated valet parking management system that manages an automated valet parking service delivered in a predetermined area.

The predetermined area includes:
a parking facility in which a vehicle supporting the automated valet parking service is parked; and
a pick-up or drop-off point that is away from the parking facility and at which a user of the automated valet parking service gets on the vehicle or gets off the vehicle.

The automated valet parking management system includes one or more processors and one or more memory devices.

The one or more processors store reference information. The reference information includes at least one of schedule information indicating a schedule of the automated valet parking service and congestion situation information indicating a congestion situation in the predetermined area.

The one or more processors are configured to execute:
acquiring a user request indicating a specified pick-up or drop-off point and a specified date and time of use that are specified by the user;
a determination process that determines, based on the reference information, whether or not it is possible to deliver the automated valet parking service to the user in accordance with the user request; and
an information delivery process that delivers notification information to the user based on the reference information, when it is not possible to deliver the automated valet parking service to the user in accordance with the user request.

The notification information includes at least one of:
the congestion situation on a route from a current position of the vehicle to the specified pick-up or drop-off point;
the congestion situation at the specified pick-up or drop-off point;
a waiting time for the user to get on the vehicle or get off the vehicle at the specified pick-up or drop-off point;
a recommended time of day of use at the specified pick-up or drop-off point; and
a substitute pick-up or drop-off point being a substitute for the specified pick-up or drop-off point.

A second aspect is directed to an automated valet parking management system that manages an automated valet parking service delivered in a predetermined area.

The predetermined area includes:
a parking facility in which a vehicle supporting the automated valet parking service is parked; and
a drop-off point that is away from the parking facility and at which a user of the automated valet parking service gets off the vehicle.

The automated valet parking management system includes one or more processors and one or more memory devices.

The one or more processors store reference information. The reference information includes at least one of schedule information indicating a schedule of the automated valet parking service and congestion situation information indicating a congestion situation in the predetermined area.

The one or more processors are configured to execute:
acquiring a user request indicating a specified drop-off point that is specified by the user; and
an information delivery process that delivers notification information to the user based on the reference information.

The notification information includes at least one of:
the congestion situation on a route from a current position of the vehicle to the specified drop-off point;
the congestion situation at the specified drop-off point;
a waiting time for the user to get off the vehicle at the specified drop-off point;
a recommended time of day of use at the specified drop-off point; and
a substitute drop-off point being a substitute for the specified drop-off point.

A third aspect is directed to an automated valet parking management method for managing an automated valet parking service delivered in a predetermined area, which is executed by a computer.

The predetermined area includes:
- a parking facility in which a vehicle supporting the automated valet parking service is parked; and
- a pick-up or drop-off point that is away from the parking facility and at which a user of the automated valet parking service gets on the vehicle or gets off the vehicle.

The automated valet parking management method includes acquiring reference information. The reference information includes at least one of schedule information indicating a schedule of the automated valet parking service and congestion situation information indicating a congestion situation in the predetermined area.

The automated valet parking management method further includes:
- acquiring a user request indicating a specified pick-up or drop-off point and a specified date and time of use that are specified by the user;
- a determination process that determines, based on the reference information, whether or not it is possible to deliver the automated valet parking service to the user in accordance with the user request; and
- an information delivery process that delivers notification information to the user based on the reference information, when it is not possible to deliver the automated valet parking service to the user in accordance with the user request.

The notification information includes at least one of:
- the congestion situation on a route from a current position of the vehicle to the specified pick-up or drop-off point;
- the congestion situation at the specified pick-up or drop-off point;
- a waiting time for the user to get on the vehicle or get off the vehicle at the specified pick-up or drop-off point;
- a recommended time of day of use at the specified pick-up or drop-off point; and
- a substitute pick-up or drop-off point being a substitute for the specified pick-up or drop-off point.

According to the present disclosure, useful notification information with respect to the user request regarding the automated valet parking service is delivered to the user. The user receiving the notification information is able to consider changing the user request and the like. That is, the user is able to have more choices. Therefore, the convenience of the automated valet parking service increases.

BRIEF DESCRIPTION OF DRAWINGS

FIG. 3 is a conceptual diagram for explaining an example of schedule information according to an embodiment of the present disclosure;

EMBODIMENTS

Embodiments of the present disclosure will be described with reference to the accompanying drawings.

1. Automated Valet Parking Service

Figure 1:
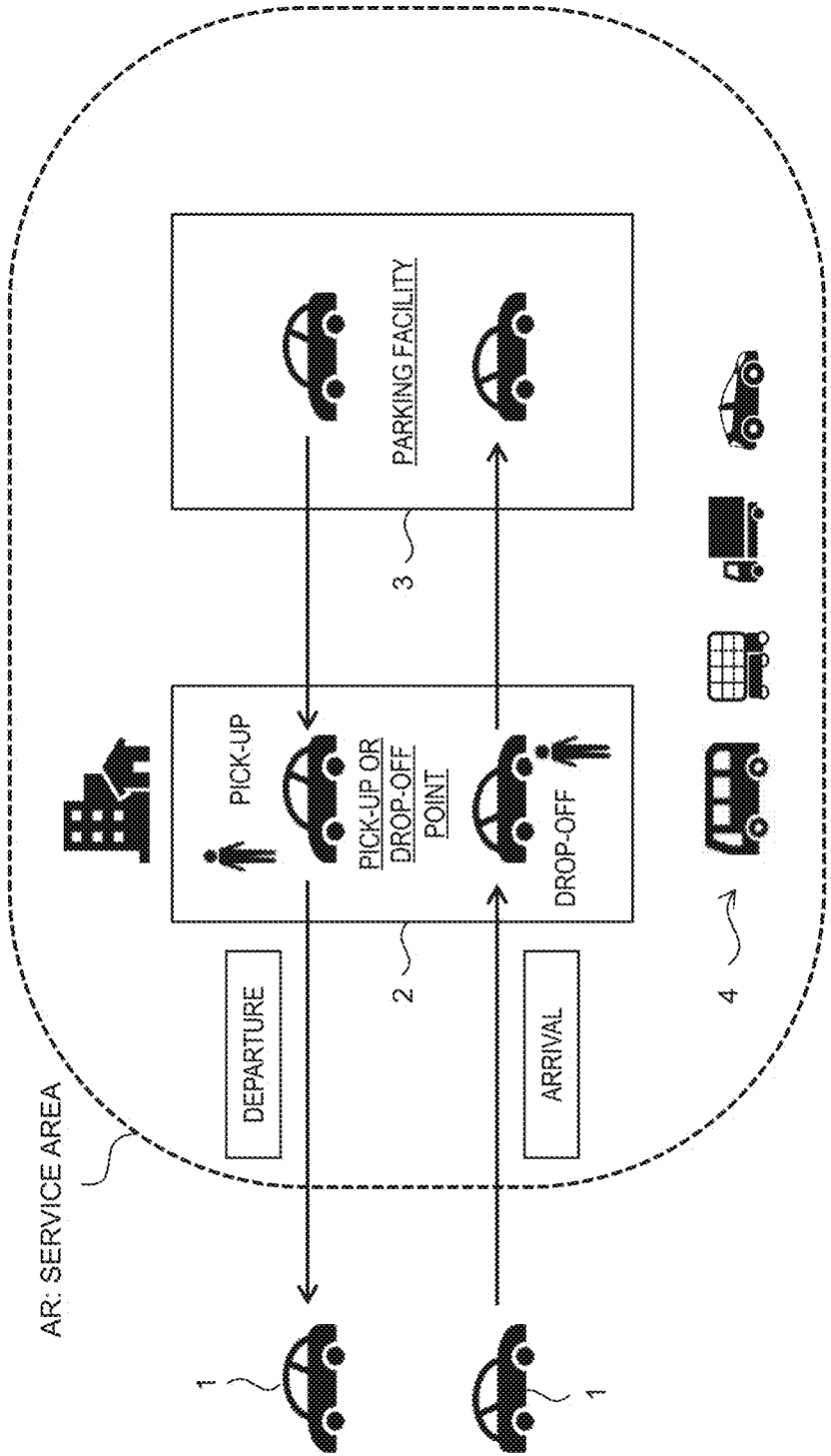
FIG. 1 is a conceptual diagram for explaining an automated valet parking service according to an embodiment of the present disclosure.

FIG. 1 is a conceptual diagram for explaining an automated valet parking service according to the present embodiment. The automated valet parking service is hereinafter referred to as an "AVP (Automated Valet Parking) service". The AVP service is a service that automatically parks a vehicle by utilizing an automated driving technology.

A service area AR is a predetermined area in which the AVP service is delivered. In the present embodiment, the service area AR is a large area to some extent. For example, the service area AR is a city such as a smart city.

A vehicle 1 is a vehicle supporting the AVP service. The vehicle 1 is capable of autonomous driving at least within the service area AR. The vehicle 1 may be capable of autonomous driving outside the service area AR as well. The vehicle 1 has a localization function, a surrounding situation recognition function, and an automated driving function, and is capable of autonomously traveling to a specified destination. Furthermore, the vehicle 1 may be manually driven by a driver.

A pick-up or drop-off point 2 is a position at which a user of the AVP service gets on the vehicle 1 or gets off the vehicle 1. In other words, the pick-up or drop-off point 2 is a position for the vehicle 1 to pick up or drop off the user. The user of the AVP service can specify any position in the service area AR as the pick-up or drop-off point 2. For example, the pick-up or drop-off point 2 is in front of the user's home. As another example, the pick-up or drop-off point 2 may be a shared pick-up or drop-off area utilized by a lot of users. Examples of the shared pick-up or drop-off area include a carriage porch of a building, an AVP-dedicated station, and the like. Typically, there are a plurality of shared pick-up or drop-off areas in the service area AR.

A parking facility 3 is a facility in which the vehicle 1 is parked. Typically, there are a plurality of parking facilities 3 in the service area AR. General vehicles other than the vehicle 1 supporting the AVP service may also be parked in the parking facility 3. The parking facility 3 includes a parking space (parking lot), a gate, a management facility, and the like. The user of the AVP service may directly bring the vehicle 1 supporting the AVP service to the parking facility 3. In that case, the AVP service may be implemented in the parking facility 3. For the AVP service in the parking facility 3, the parking facility 3 may be provided with a pick-up or drop-off point at which the user gets on the vehicle 1 or gets off the vehicle 1. Alternatively, the user may park the vehicle 1 in the parking space in the parking facility 3 on one's own.

The pick-up or drop-off point 2 need not be included in the parking facility 3. The pick-up or drop-off point 2 and the parking facility 3 may be apart from each other by a certain distance or more. That is, the user can specify the pick-up or drop-off point 2 away from the parking facility 3 to some extent. In the following description, a case where the pick-up or drop-off point 2 is away from the parking facility 3 by a certain distance or more is considered.

On the user's departure, the vehicle 1 autonomously exits from the parking facility 3, and autonomously travels to the pick-up or drop-off point 2 (i.e. a pick-up point). The user gets on the vehicle 1 at the pick-up or drop-off point 2. After that, the vehicle 1 travels from the pick-up or drop-off point 2 toward a next destination by the automated driving or manual operation. The destination may be within the service area AR or may be outside the service area AR.

On the other hand, on the user's arrival, the vehicle 1 travels toward the pick-up or drop-off point 2 (i.e., a drop-off point) by the automated driving or manual operation. The user gets off the vehicle 1 at the pick-up or drop-off point 2. After that, the vehicle 1 autonomously travels from the pick-up or drop-off point 2 to the parking facility 3, and autonomously enters the parking facility 3.

It should be noted that, in the service area AR, there are also a variety of mobilities (moving bodies) 4 other than the vehicle 1. Examples of the mobility 4 include a bus, a ride-sharing vehicle, a general vehicle not supporting the AVP service, a logistics robot, and the like.

2. Automated Valet Parking Management System 2-1. Outline

Figure 2:
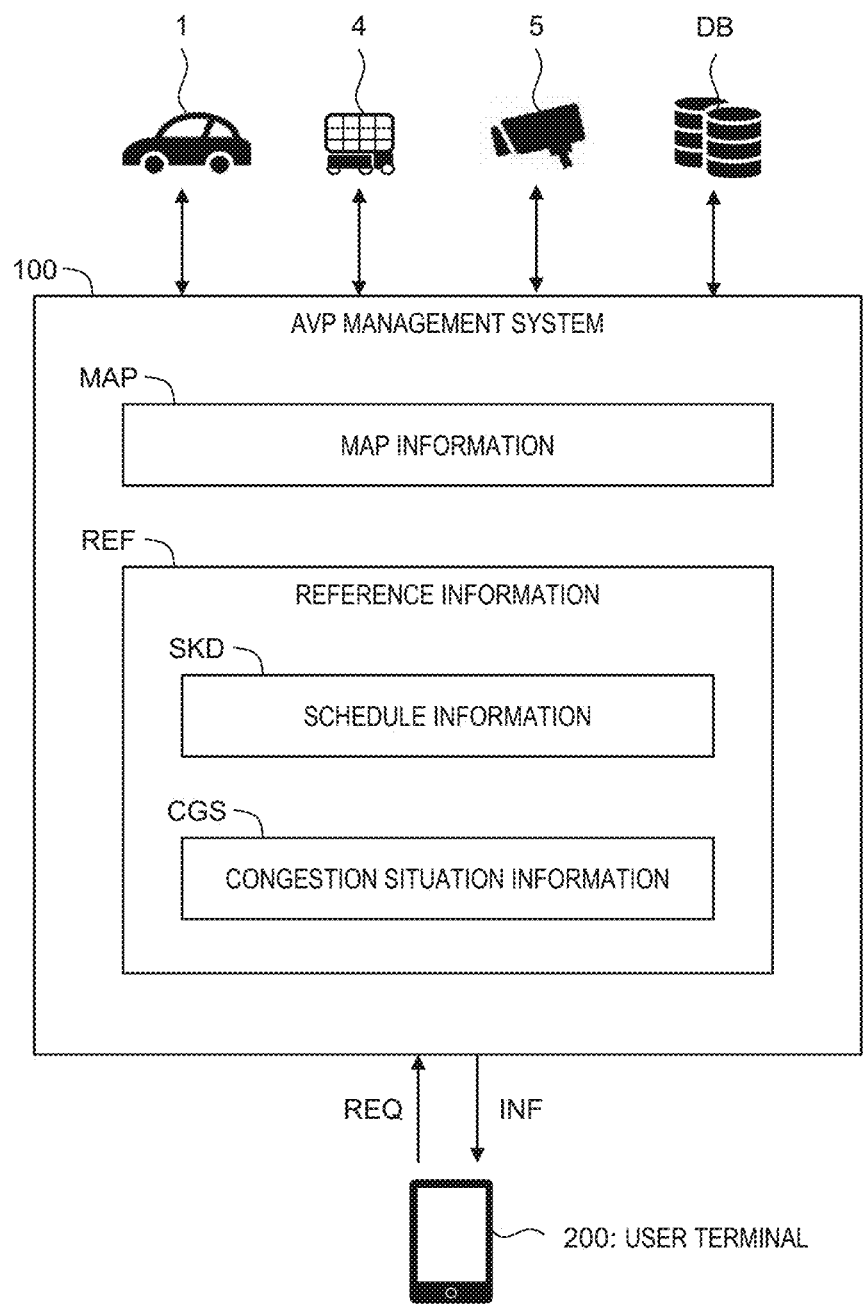
FIG. 2 is a conceptual diagram for explaining an outline of an automated valet parking management system according to an embodiment of the present disclosure.

FIG. 2 is a conceptual diagram for explaining an outline of an automated valet parking management system 100 according to the present embodiment. The automated valet parking management system 100 is hereinafter referred to as an "AVP management system 100." The AVP management system 100 manages the AVP service. The management of the AVP service includes management of users of the AVP service, management of a schedule of the AVP service, management of a usage situation of the parking facility 3, management of the vehicle 1, instruction to the vehicle 1, information delivery to the user, and the like. The AVP management system 100 is, for example, a management server. The AVP management system 100 may be a distributed system.

The AVP management system 100 has map information MAP of the service area AR. The map information MAP indicates arrangements of roads, the pick-up or drop-off points 2 (shared pick-up or drop-off areas), the parking facilities 3, landmarks, and the like in the service area AR. In addition, the map information MAP includes map information of an interior of each parking facility 3, that is, a layout of the parking space and the like.

The AVP management system 100 is capable of communicating with the vehicle 1 supporting the AVP service. The AVP management system 100 collects a variety of information including position information from the vehicle 1. Moreover, the AVP management system 100 instructs the vehicle 1 to enter or exit the parking facility 3.

The AVP management system 100 is capable of communicating with a user terminal 200. The user terminal 200 is a terminal device operated by the user of the AVP service. Typically, the user terminal 200 is owned by the user. Examples of the user terminal 200 include a smartphone, a tablet, a personal computer, and the like.

Hereinafter, a case where a user X uses the AVP service will be considered. A vehicle 1X is the vehicle 1 used by the user X. It is assumed that user information of the user X is registered in advance in the automated valet parking management system 100.

The user X uses the user terminal 200 to input a "user request REQ." The user request REQ includes at least a "specified pick-up or drop-off point 2X" that is the pick-up or drop-off point 2 specified (desired) by the user X. The specified pick-up or drop-off point 2X is away from the parking facility 3 to some extent. The user request REQ may further include a "specified date and time of use" that is a date and time of use specified (desired) by the user X. In the case of the user X's departure, the specified pick-up or drop-off point 2X is a specified pick-up point, and the specified date and time of use is a specified date and time of pick-up. In the case of the user X's arrival, the specified pick-up or drop-off point 2X is a specified drop-off point, and the specified date and time of use is a specified date and time of drop-off. In the case of the user X's arrival, the user request REQ may further indicate a parking facility 3 that is specified (desired) by the user X.

The user terminal 200 communicates with the AVP management system 100 to transmit the user request REQ to the AVP management system 100. The AVP management system 100 acquires the user request REQ transmitted from the user terminal 200 and holds it as reservation information of the AVP service.

A basic process in the case of the user X's departure is as follows. Typically, the user request REQ indicates the specified pick-up or drop-off point 2X (i.e., the specified pick-up point) and the specified date and time of use (i.e., the specified date and time of pick-up). At the approach of the specified date and time of use, the AVP management system 100 generates an exit instruction to the vehicle 1X based on the user request REQ and the map information MAP. The exit instruction includes information of the specified pick-up or drop-off point 2X which is a destination, and instructs the vehicle 1X to travel to the specified pick-up or drop-off point 2X. The exit instruction may include a travel route to the specified pick-up or drop-off point 2X. The AVP-management system 100 communicates with the vehicle 1X to transmit the exit instruction to the vehicle 1X. The vehicle 1X executes an exit process in accordance with the exit instruction. More specifically, the vehicle 1X autonomously exits from the parking facility 3, and autonomously travels to the specified pick-up or drop-off point 2X. The user X gets on the vehicle 1X at the specified pick-up or drop-off point 2X. The vehicle 1X notifies the AVP-management system 100 of completion of the exit process. After that, the vehicle 1X travels from the specified pick-up or drop-off point 2X toward a next destination by the automated driving or manual operation.

A basic process in the case of the user X's arrival is as follows. The user request REQ indicates at least the specified pick-up or drop-off point 2X (i.e., the specified drop-off point). The vehicle 1X travels toward the specified pick-up or drop-off point 2X by the automated driving or manual operation. The user X gets off the vehicle 1X at the specified pick-up or drop-off point 2X. The AVP-management system 100 selects a parking facility 3 for parking the vehicle 1X from among a plurality of candidates. When the user request REQ indicates a parking facility 3 that is specified (desired) by the user X, the AVP management system 100 may secure in advance the parking facility 3 specified by the user X. When the user request REQ indicates the specified date and time of use (i.e., the specified date and time of drop-off), the AVP management system 100 may secure in advance an empty parking facility 3 in consideration of the specified date and time of use. The AVP management system 100 generates an entry instruction to the vehicle 1X based on the map information MAP. The entry instruction includes information of the parking facility 3 which is the destination, and instructs the vehicle 1X to travel to the parking facility 3. The entry instruction may include a travel route to the parking facility 3. The AVP-management system 100 communicates with the vehicle 1X to transmit the entry instruction to the vehicle 1X. The vehicle 1X executes an entry process in accordance with the entry instruction. More specifically, the vehicle 1X autonomously travels from the specified pick-up or drop-off point 2X to the parking facility 3, and autonomously enters the parking facility 3. Then, the vehicle 1X notifies the AVP-management system 100 of completion of the entry process.

2-2. Information Delivery Process

The AVP management system 100 according to the present embodiment further executes an "information delivery process" that delivers information to the user X. In particular, the AVP management system 100 delivers (notifies) useful information with respect to the above-described user request REQ to the user X. The information delivered to the user X is hereinafter referred to as "notification information INF." Typically, the AVP management system 100 notifies the user X of the notification information INF via the user terminal 200. More specifically, the AVP management system 100 communicates with the user terminal 200 to transmit the notification information INF to the user terminal 200. The user terminal 200 has a display device and displays the notification information INF received from the AVP management system 100 on the display device. Thus, the notification information INF is notified to the user X.

The AVP management system 100 generates the notification information INF based on "reference information REF." The reference information REF includes at least one of "schedule information SKD" and "congestion situation information CGS" which are described below.

2-2-1. Schedule Information

The schedule information SKD is information indicating a schedule of the AVP service. For example, the schedule information SKD indicates a reservation status (availability) of the AVP service. As another example, the schedule information SKD may include a usage estimate of the AVP service.

FIG. 3 is a conceptual diagram for explaining an example of the schedule information SKD. The schedule information SKD includes an entry for each reservation of the AVP service. Each entry includes a user ID, information indicating whether the reservation is for pick-up or drop-off, the specified date and time of use, the specified pick-up or drop-off point, the vehicle 1 to be used, the parking facility 3 in which the vehicle 1 is being parked or the parking facility 3 in which the vehicle 1 is scheduled be parked, and the like. The AVP management system 100 manages the schedule information SKD based on the user request REQ received from each user. Moreover, the AVP management system 100 updates the schedule information SKD based on the notification of completion of the entry process or the exit process received from each vehicle 1.

In addition, the AVP management system 100 is able to access a database DB (see FIG. 2) that is managed by a calendar system. The calendar system manages schedules of residents in the service area AR. Residents in the service area AR can register their own schedules (action plans) in the calendar system, if they desire. The schedule may include a usage schedule of the AVP service. The AVP management system 100 may generate and update the schedule information SKD by cooperating with the calendar system and accessing the database DB managed by the calendar system.

Figure 4:
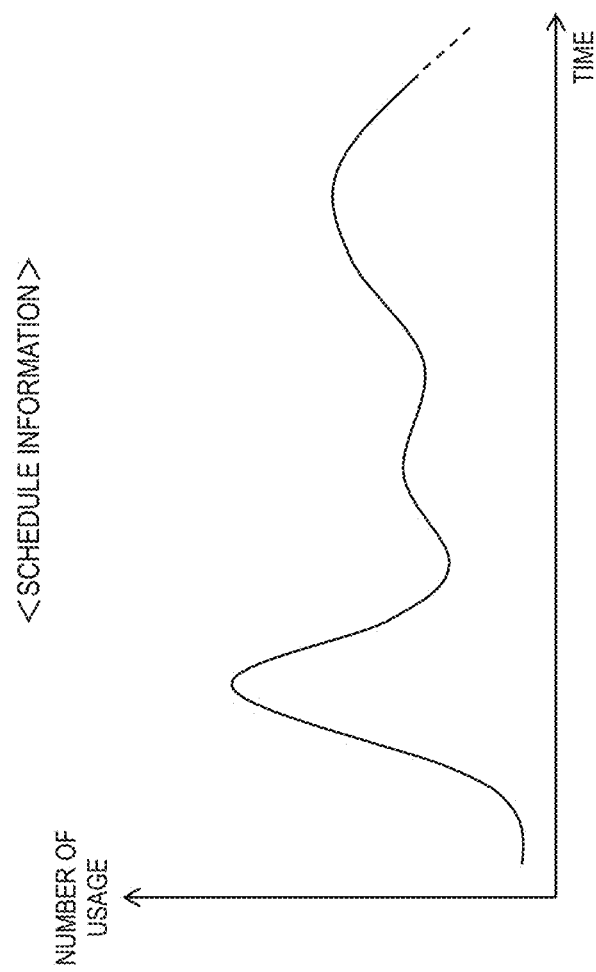
FIG. 4 is a conceptual diagram for explaining another example of schedule information according to an embodiment of the present disclosure.

FIG. 4 is a conceptual diagram for explaining another example of the schedule information SKD. In FIG. 4, a horizontal axis represents time, and a vertical axis represents a number of AVP service usage at a certain pick-up or drop-off point 2. The number of AVP service usage is a number of reservations or an estimated number. That is, in the example shown in FIG. 4, the schedule information SKD indicates a reservation status or a usage estimate of the AVP service for each pick-up or drop-off point 2 on a time-series basis. The reservation status of the AVP service for each pick-up or drop-off point 2 is obtained based on the user request REQ received from each user. The usage estimate of the AVP service for each pick-up or drop-off point 2 is obtained from past statistical information.

2-2-2. Congestion Situation Information

The congestion situation information CGS is information indicating a congestion situation in the service area AR. Especially, the congestion situation information CGS indicates a congestion situation of moving bodies in the service area AR. Examples of the moving body include the vehicle 1, the mobility 4 (see FIG. 1), human, and the like.

Figure 5:
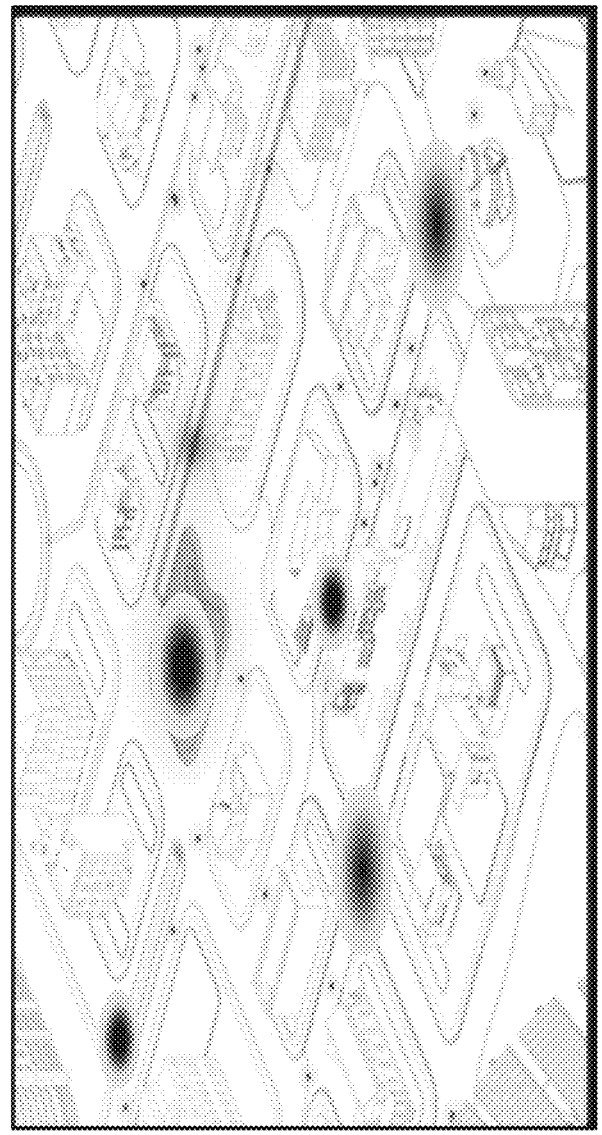
FIG. 5 is a conceptual diagram for explaining an example of congestion situation information according to an embodiment of the present disclosure.

FIG. 5 is a conceptual diagram for explaining an example of the congestion situation information CGS. In the example shown in FIG. 5, the congestion situation information CGS represents the congestion situation in the service area AR in a heat map format.

For example, the vehicle 1 acquires position information indicating its position. The mobility 4 may also acquire position information indicating its position. The AVP management system 100 communicates with the vehicle 1 and the mobility 4 to collect the position information from the vehicle 1 and the mobility 4. Based on the collected position information, the AVP management system 100 is able to generate and update the congestion situation information CGS regarding the vehicle 1 and the mobility 4.

As another example, the vehicle 1 uses an in-vehicle camera to acquire image information indicating a situation around the vehicle 1. The mobility 4 may also use a camera to acquire image information indicating a situation around the mobility 4. The AVP management system 100 communicates with the vehicle 1 and the mobility 4 to collect the image information together with the position information from the vehicle 1 and the mobility 4. The AVP management system 100 is able to generate and update the congestion situation information CGS by analyzing the collected image information.

As yet another example, a lot of infrastructure cameras 5 (see FIG. 2) may be installed in the service area AR. The infrastructure camera 5 images a surrounding situation and transmits the image information to the AVP management system 100. The AVP management system 100 is able to generate and update the congestion situation information CGS by analyzing the image information collected from the infrastructure cameras 5.

2-2-3. Information Delivery Process in Case of Departure

Hereinafter, an example of the information delivery process in the case of the user X's departure will be described. The user request REQ indicates the specified pick-up or drop-off point 2X (i.e., the specified pick-up point) and the specified date and time of use (i.e., the specified date and time of pick-up).

Figure 6:
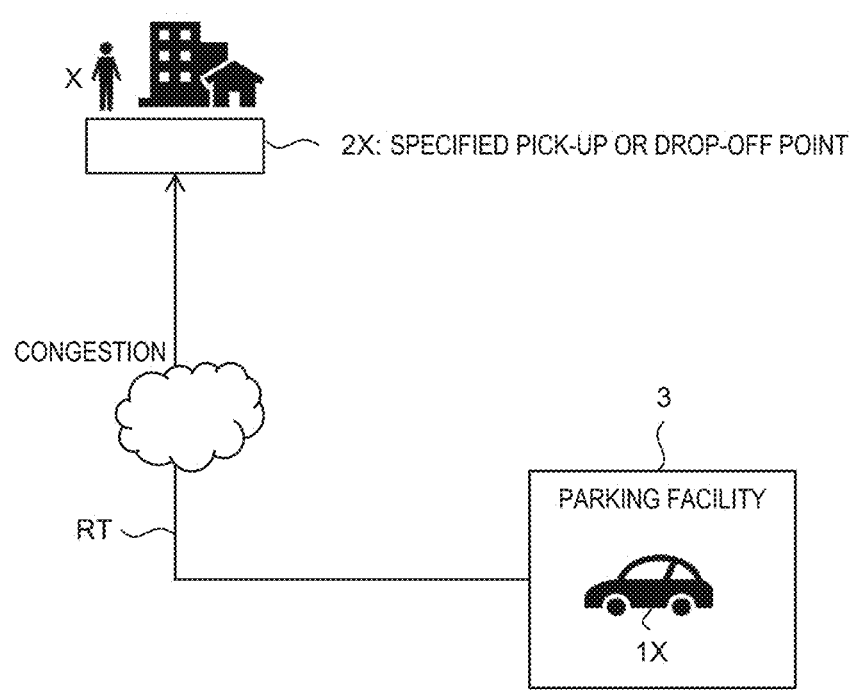
FIG. 6 is a conceptual diagram for explaining an information delivery process in an case of user departure according to an embodiment of the present disclosure.

As shown in FIG. 6, the vehicle 1X moves from the parking facility 3 to the specified pick-up or drop-off point 2X. At that time, there may be congestion with moving bodies on a travel route RT from the parking facility 3 to the specified pick-up or drop-off point 2X. When the congestion with moving bodies occurs on the travel route RT, the vehicle 1X may not be able to arrive at the specified pick-up or drop-off point 2X by the specified date and time of use. That is, it may not be possible to deliver the AVP service to the user X in accordance with the user request REQ.

Figure 7:
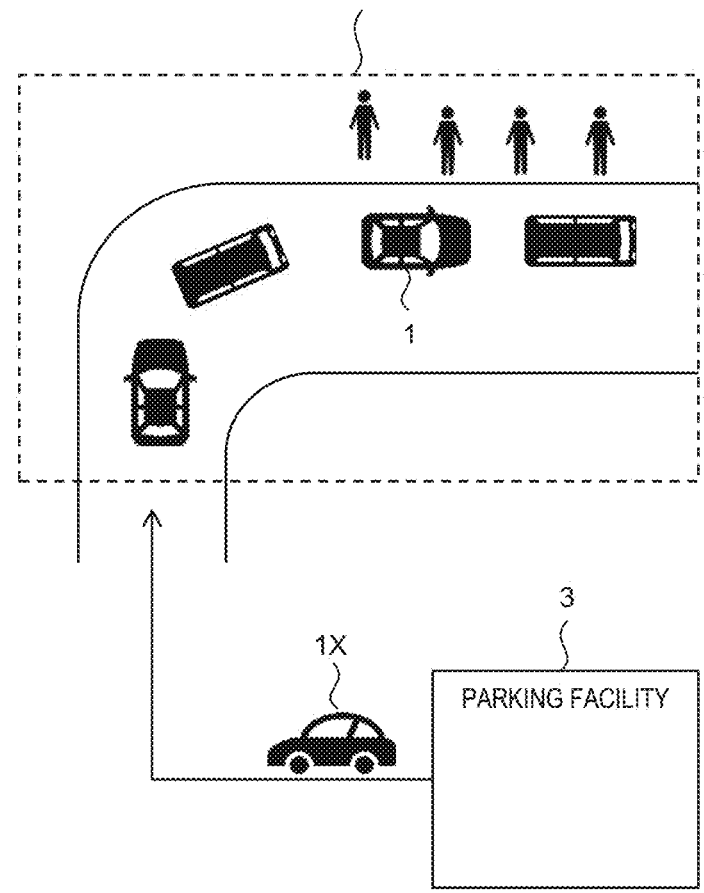
FIG. 7 is a conceptual diagram for explaining an information delivery process in an case of user departure according to an embodiment of the present disclosure.

FIG. 7 shows a case where the specified pick-up or drop-off point 2X is congested. In the example shown in FIG. 7, the specified pick-up or drop-off point 2X is a shared pick-up or drop-off area. During rush hours and the like, a situation where many users use the AVP service in the same pick-up or drop-off area is conceivable. In other words, a situation where many users use the AVP service at the same time of day as the specified date and time of use specified by the user X is conceivable. Even when the vehicle 1X comes up to the vicinity of the shared pick-up or drop-off area, it may take further time for the user X's turn to come, since the shared pick-up or drop-off area is limited in capacity. In that case, the user X may not be able to get on the vehicle 1X at the specified date and time of use. In other words, it may not be possible to deliver the AVP service to the user X in accordance with the user request REQ.

In view of the above, for example, the AVP management system 100 executes a "determination process" that determines whether or not it is possible to deliver the AVP service to the user X in accordance with the user request REQ. The determination process is executed based on the above-described reference information REF, that is, at least one of the schedule information SKD and the congestion situation information CGS.

For example, the congestion situation of the moving bodies on the travel route RT as shown in FIG. 6 can be grasped based on the congestion situation information CGS. The AVP management system 100 estimates an arrival time at which the vehicle 1X arrives at the specified pick-up or drop-off point 2X, based on the position information of the vehicle 1X, the specified pick-up or drop-off point 2X, the map information MAP, and the congestion situation information CGS. Then, the AVP management system 100 performs the determination process by comparing the estimated arrival time and the specified date and time of use.

As another example, the congestion situation at the specified pick-up or drop-off point 2X as shown in FIG. 7 can be grasped based on the schedule information SKD (see FIGS. 3 and 4) regarding the specified pick-up or drop-off point 2X or the congestion situation information CGS regarding the specified pick-up or drop-off point 2X. That is, the AVP-management system 100 is able to recognize the congestion situation at the specified pick-up or drop-off point 2X based on the reference information REF. Based on the congestion situation at the specified pick-up or drop-off point 2X, the AVP management system 100 estimates a pick-up time at which the user X is able to get on the vehicle 1X. Then, the AVP management system 100 performs the determination process by comparing the estimated pick-up time and the specified date and time of use.

In the information delivery process, the AVP management system 100 notifies the user X of the notification information INF through the user terminal 200.

For example, the notification information INF indicates a result of the determination process, that is, availability of the AVP service desired by the user X. When the result of the determination process is negative, the user X can consider changing the user request REQ. That is, the user X can consider changing at least one of the specified pick-up or drop-off point 2X and the specified date and time of use. Alternatively, the user X can consider directly heading to the parking facility 3 in which the vehicle 1X is parked and directly getting in the vehicle 1X.

When the result of the determination process is negative, the AVP management system 100 may notify the user X of the notification information INF as exemplified below, based on the reference information REF. Alternatively, regardless of the result of the determination process, the AVP management system 100 may notify the user X of the notification information INF as exemplified below.

For example, the notification information INF may include the congestion situation on the travel route RT from a current position of the vehicle 1X to the specified pick-up or drop-off point 2X. The AVP management system 100 acquires the congestion situation on the travel route RT based on the position information of the vehicle 1X, the specified pick-up or drop-off point 2X, the map information MAP, and the congestion situation information CGS. The user X receiving the notification information INF can consider changing the specified pick-up or drop-off point 2X such that the vehicle 1X is able to avoid the congested area. Alternatively, the user X can consider directly heading to the parking facility 3 in which the vehicle 1X is parked and directly getting in the vehicle 1X.

As another example, the notification information INF may include the congestion situation at the specified pick-up or drop-off point 2X. The AVP-management system 100 acquires the congestion situation at the specified pick-up or drop-off point 2X based on the schedule information SKD regarding the specified pick-up or drop-off point 2X or the congestion situation information CGS regarding the specified pick-up or drop-off point 2X. The user X receiving the notification information INF can consider changing the specified pick-up or drop-off point 2X. Alternatively, the user X can consider directly heading to the parking facility 3 in which the vehicle 1X is parked and directly getting in the vehicle 1X.

As yet another example, the notification information INF may include a waiting time for the user X to get on the vehicle 1X at the specified pick-up or drop-off point 2X. The AVP management system 100 estimates an arrival time at which the vehicle 1X arrives at the specified pick-up or drop-off point 2X, based on the position information of the vehicle 1X, the specified pick-up or drop-off point 2X, the map information MAP, and the congestion situation information CGS. Alternatively, the AVP management system 100 estimates a pick-up time at which the user X is able to get on the vehicle 1X, based on the congestion situation at the specified pick-up or drop-off point 2X. The AVP management system 100 calculates the waiting time based on the estimated arrival time or the estimated pick-up time. The user X receiving the notification information INF can consider changing the user request REQ. Alternatively, the user X can consider directly heading to the parking facility 3 in which the vehicle 1X is parked and directly getting in the vehicle 1X.

As yet another example, the notification information INF may include a recommended time of day of use at the specified pick-up or drop-off point 2X. For example, the recommended time of day of use is a time of day when the specified pick-up or drop-off point 2X is relatively vacant. The AVP management system 100 grasps the reservation status or the usage estimate of the AVP service at the specified pick-up or drop-off point 2X based on the schedule information SKD as shown in FIG. 4, and determines the recommended time of day of use. The user X receiving the notification information INF can consider changing the specified date and time of use to a time included in the recommended time of day of use.

Figure 8:
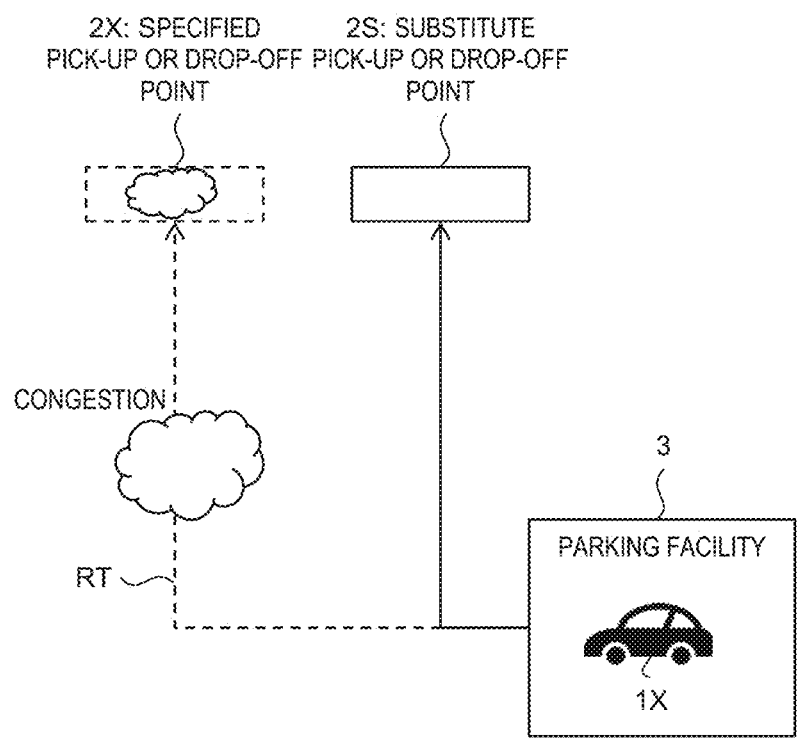
FIG. 8 is a conceptual diagram for explaining an information delivery process in an case of user departure according to an embodiment of the present disclosure.

As yet another example, the notification information INF may include a "substitute pick-up or drop-off point 2S (i.e., a substitute pick-up point)" being a substitute for the specified pick-up or drop-off point 2X. FIG. 8 conceptually shows the substitute pick-up or drop-off point 2S. For example, when there is a congested area on the travel route RT from the current position of the vehicle 1 to the specified pick-up or drop-off point 2X, the substitute pick-up or drop-off point 2S is another pick-up or drop-off point 2 that is accessible by the vehicle 1 with avoiding the congested area. The AVP management system 100 is able to search for such the substitute pick-up or drop-off point 2S based on the position information of the vehicle 1X, the specified pick-up or drop-off point 2X, the map information MAP, and the congestion situation information CGS. As another example, when the specified pick-up or drop-off point 2X is congested, the substitute pick-up or drop-off point 2S is another pick-up or drop-off point 2 that is more vacant as compared with the specified pick-up or drop-off point 2X. The AVP management system 100 is able to search for such the substitute pick-up or drop-off point 2S based on the schedule information SKD or the congestion situation information CGS. In either case, it is preferable that the substitute pick-up or drop-off point 2S is determined such that the user X is able to get on the vehicle 1X earlier as compared with the case where the original specified pick-up or drop-off point 2X is used without change. The user X receiving the notification information INF can consider changing the specified pick-up or drop-off point 2X to the substitute pick-up or drop-off point 2S.

2-2-4. Information Delivery Process in Case of Arrival

Hereinafter, an example of the information delivery process in the case of the user X's arrival will be described. The user request REQ indicates at least the specified pick-up or drop-off point 2X (i.e., the specified drop-off point). The user request REQ may further indicate the specified date and time of use (i.e., the specified date and time of drop-off).

Figure 9:
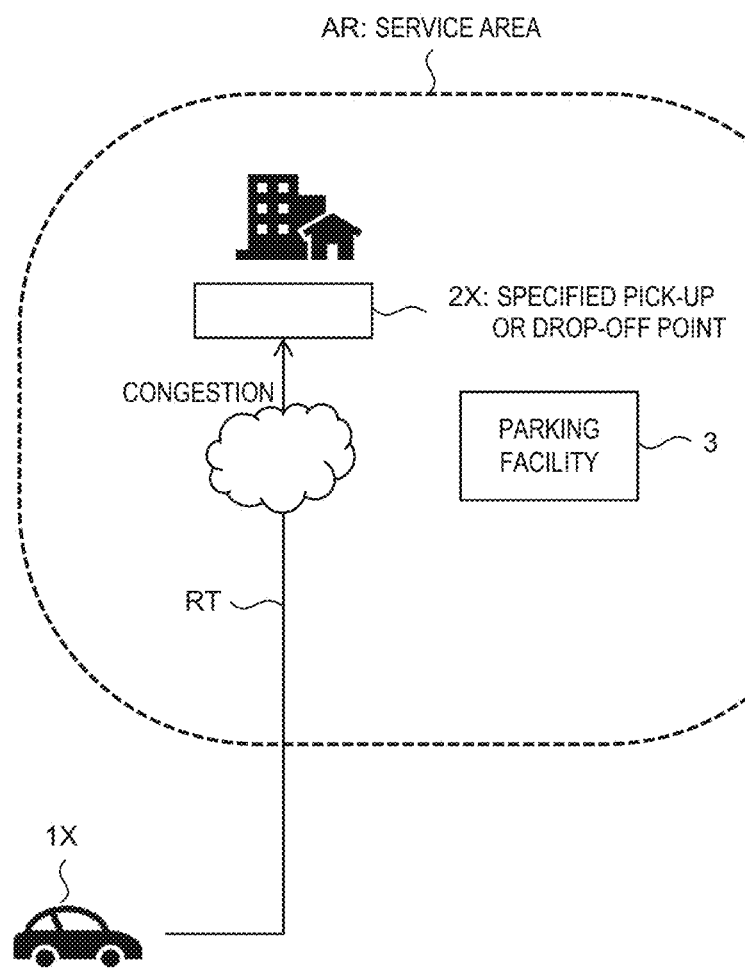
FIG. 9 is a conceptual diagram for explaining an information delivery process in an case of user arrival according to an embodiment of the present disclosure.
Figure 10:
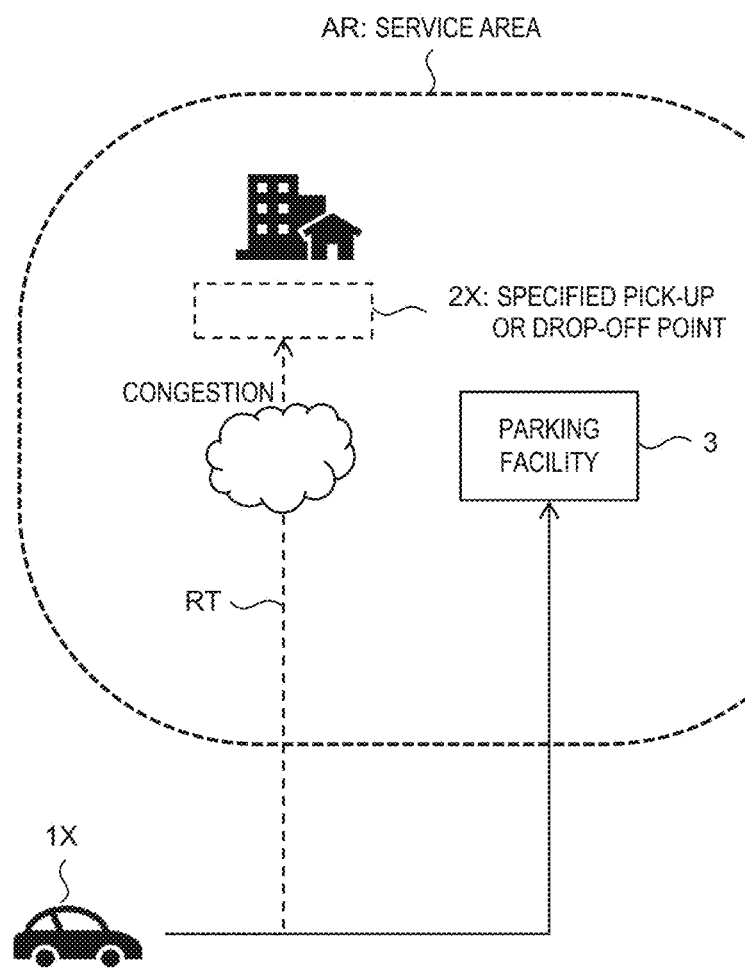
FIG. 10 is a conceptual diagram for explaining an information delivery process in an case of user arrival according to an embodiment of the present disclosure.

The user X is on board the vehicle 1X and is scheduled to get off the vehicle 1X at the specified pick-up or drop-off point 2X. As shown in FIG. 9, the vehicle 1X travels toward the specified pick-up or drop-off point 2X in the service area AR by the automated driving or manual operation. At that time, there may be congestion with moving bodies on a travel route RT from a current position of the vehicle 1X to the specified pick-up or drop-off point 2X. When the congestion with moving bodies occurs on the travel route RT, it takes time for the vehicle 1X to reach the specified pick-up or drop-off point 2X. If it takes time, the user X may desire to park the vehicle 1X on one's own instead of utilizing the automated valet parking service. That is, as shown in FIG. 10, the user X may desire to directly head to the parking facility 3 instead of the specified pick-up or drop-off point 2X and to park the vehicle 1X in the parking facility 3 on one's own.

It is also conceivable that the specified pick-up or drop-off point 2X is congested as shown in the foregoing FIG. 7. In that case, it may take further time for the user X's turn to come. If it takes time, the user X may desire to park the vehicle 1X on one's own instead of utilizing the automated valet parking service. That is, as shown in FIG. 10, the user X may desire to directly head to the parking facility 3 instead of the specified pick-up or drop-off point 2X and to park the vehicle 1X in the parking facility 3 on one's own.

In the information delivery process, the AVP management system 100 notifies the user X of the notification information INF through the user terminal 200. More specifically, the AVP management system 100 notifies the user X of the notification information INF as exemplified below, based on the reference information REF.

For example, the notification information INF may include the congestion situation on the travel route RT from the current position of the vehicle 1X to the specified pick-up or drop-off point 2X. The AVP management system 100 acquires the congestion situation on the travel route RT based on the position information of the vehicle 1X, the specified pick-up or drop-off point 2X, the map information MAP, and the congestion situation information CGS. The user X receiving the notification information INF can consider changing the specified pick-up or drop-off point 2X such that the vehicle 1X is able to avoid the congested area. Alternatively, the user X can consider directly heading to the parking facility 3 and parking the vehicle 1X in the parking facility 3 on one's own.

As another example, the notification information INF may include the congestion situation at the specified pick-up or drop-off point 2X. The AVP-management system 100 acquires the congestion situation at the specified pick-up or drop-off point 2X based on the schedule information SKD regarding the specified pick-up or drop-off point 2X or the congestion situation information CGS regarding the specified pick-up or drop-off point 2X. The user X receiving the notification information INF can consider changing the specified pick-up or drop-off point 2X. Alternatively, the user X can consider directly heading to the parking facility 3 and parking the vehicle 1X in the parking facility 3 on one's own.

As yet another example, the notification information INF may include a waiting time for the user X to get off the vehicle 1X at the specified pick-up or drop-off point 2X. The AVP management system 100 estimates an arrival time at which the vehicle 1X arrives at the specified pick-up or drop-off point 2X, based on the position information of the vehicle 1X, the specified pick-up or drop-off point 2X, the map information MAP, and the congestion situation information CGS. Alternatively, the AVP management system 100 estimates a drop-off time at which the user X is able to get off the vehicle 1X, based on the congestion situation at the specified pick-up or drop-off point 2X. The AVP management system 100 calculates the waiting time based on the estimated arrival time or the estimated drop-off time. The user X receiving the notification information INF can consider changing the user request REQ. Alternatively, the user X can consider directly heading to the parking facility 3 and parking the vehicle 1X in the parking facility 3 on one's own.

As yet another example, the notification information INF may include a recommended time of day of use at the specified pick-up or drop-off point 2X. For example, the recommended time of day of use is a time of day when the specified pick-up or drop-off point 2X is relatively vacant. The AVP management system 100 grasps the reservation status or the usage estimate of the AVP service at the specified pick-up or drop-off point 2X based on the schedule information SKD as shown in FIG. 4, and determines the recommended time of day of use. The user X receiving the notification information INF can consider changing the specified date and time of use to a time included in the recommended time of day of use.

Figure 11:
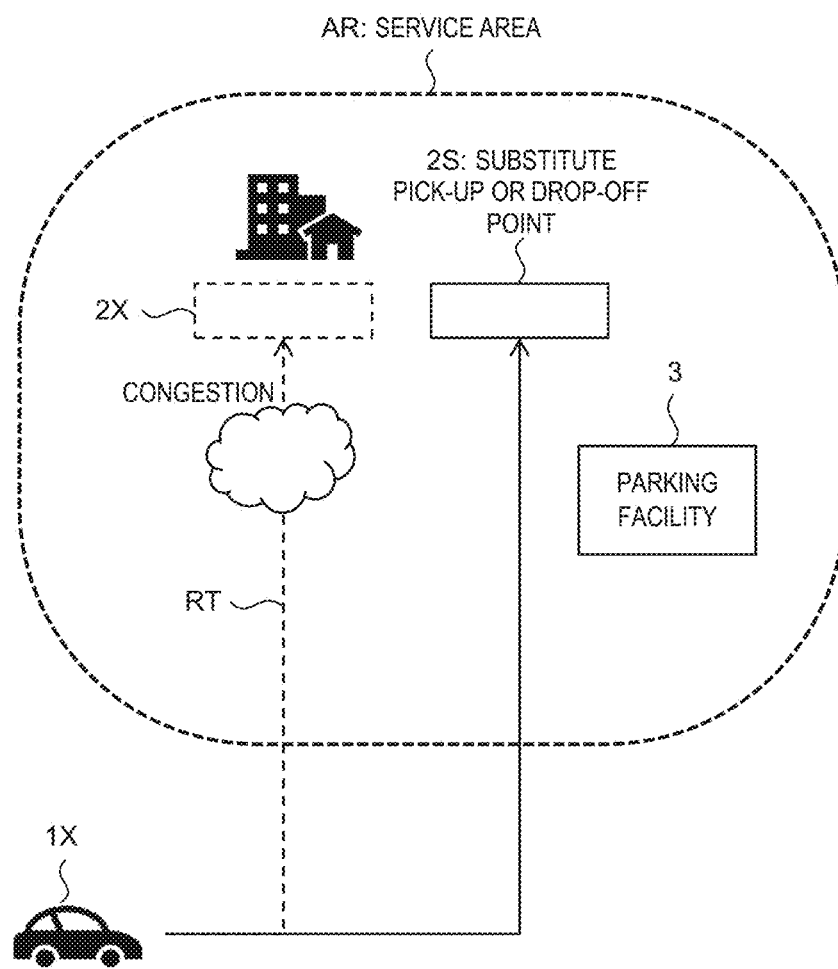
FIG. 11 is a conceptual diagram for explaining an information delivery process in an case of user arrival according to an embodiment of the present disclosure.

As yet another example, the notification information INF may include a "substitute pick-up or drop-off point 2S (i.e., a substitute drop-off point)" being a substitute for the specified pick-up or drop-off point 2X. FIG. 11 conceptually shows the substitute pick-up or drop-off point 2S. For example, when there is a congested area on the travel route RT from the current position of the vehicle 1 to the specified pick-up or drop-off point 2X, the substitute pick-up or drop-off point 2S is another pick-up or drop-off point 2 that is accessible by the vehicle 1 with avoiding the congested area. The AVP management system 100 is able to search for such the substitute pick-up or drop-off point 2S based on the position information of the vehicle 1X, the specified pick-up or drop-off point 2X, the map information MAP, and the congestion situation information CGS. As another example, when the specified pick-up or drop-off point 2X is congested, the substitute pick-up or drop-off point 2S is another pick-up or drop-off point 2 that is more vacant as compared with the specified pick-up or drop-off point 2X. The AVP management system 100 is able to search for such the substitute pick-up or drop-off point 2S based on the schedule information SKD or the congestion situation information CGS. In either case, it is preferable that the substitute pick-up or drop-off point 2S is determined such that the user X is able to get off the vehicle 1X earlier as compared with the case where the original specified pick-up or drop-off point 2X is used without change. The user X receiving the notification information INF can consider changing the specified pick-up or drop-off point 2X to the substitute pick-up or drop-off point 2S.

When the user request REQ indicates not only the specified pick-up or drop-off point 2X (i.e., the specified drop-off point) but also the specified date and time of use (i.e., the specified date and time of drop-off), the AVP-management system 100 may execute the "determination process" described above. That is, the AVP management system 100 may determine whether or not it is possible to deliver the AVP service to the user X in accordance with the user request REQ. As described above, the determination process is executed based on the reference information REF, that is, at least one of the schedule information SKD and the congestion situation information CGS.

When the result of the determination process is negative, the AVP management system 100 may notify the user X of the notification information INF described above.

As still another example, the notification information INF may indicate the result of the determination process, that is, availability of the AVP service desired by the user X. When the result of the determination process is negative, the user X can consider changing the user request REQ. Alternatively, the user X can consider directly heading to the parking facility 3 and parking the vehicle 1X in the parking facility 3 on one's own.

2-3. Effects

According to the present embodiment, as described above, useful notification information INF with respect to the user request REQ from the user X regarding the AVP service is delivered to the user X. The user X receiving the notification information INF is able to consider changing the user request REQ and the like. That is, the user X is able to have more choices. Therefore, the convenience of the AVP service increases.

When the user X changes the user request REQ, it is expected that the congestion at the specified pick-up or drop-off point 2X is eased more quickly. In other words, it is expected that the usage of each pick-up or drop-off point 2 is smoothed spatially or temporally. This means increase in efficiency of the AVP service, which is preferable.

When the specified pick-up or drop-off point 2X is congested at the specified date and time of use, an incentive may be given for the changing of the user request REQ. For example, the user X who accepts the changing of the user request REQ is granted a privilege. Thus, it is expected that smoothing of the usage of each pick-up or drop-off point 2 is further promoted. As a result, the efficiency of the AVP service is further improved.

3. Vehicle Control System 3-1. Configuration Example

Figure 12:
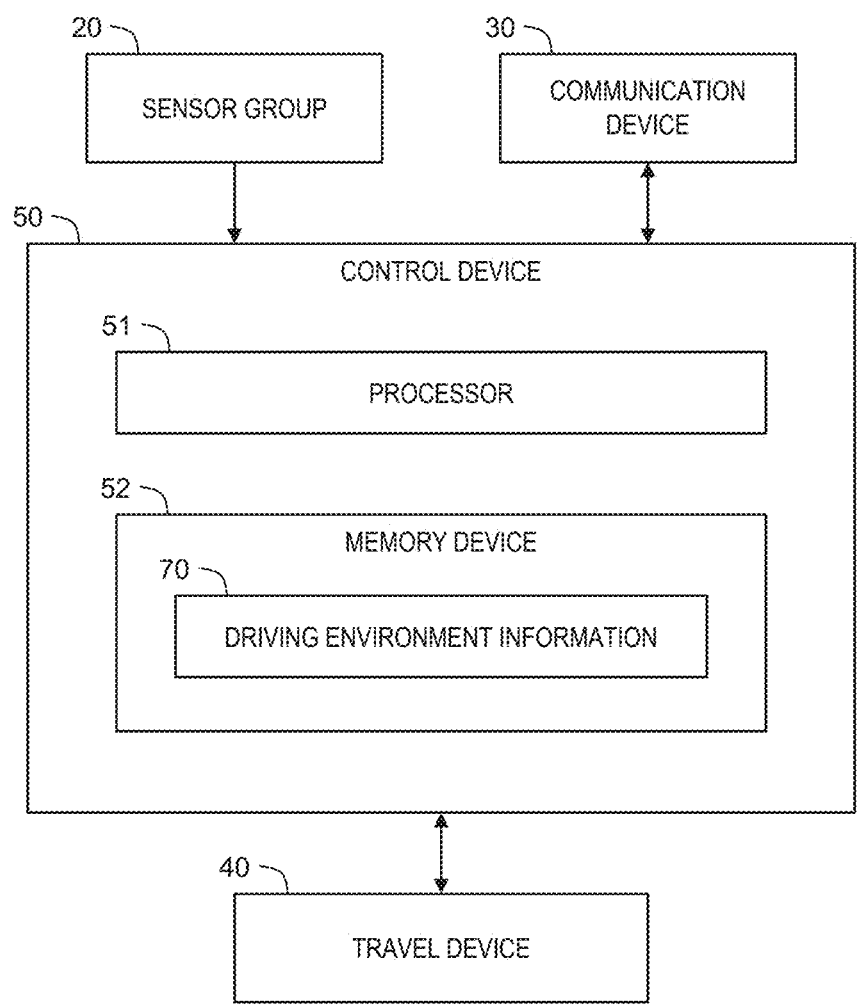
FIG. 12 is a block diagram showing a configuration example of a vehicle control system according to an embodiment of the present disclosure.

FIG. 12 is a block diagram showing a configuration example of a vehicle control system 10 according to the present embodiment. The vehicle control system 10 controls the vehicle 1. Typically, the vehicle control system 10 is installed on the vehicle 1. Alternatively, at least a part of the vehicle control system 10 may be included in a remote operation system outside the vehicle 1 and remotely control the vehicle 1. That is, the vehicle control system 10 may be distributed in the vehicle 1 and an external device.

The vehicle control system 10 includes a sensor group 20, a communication device 30, a travel device 40, and a control device 50.

The sensor group 20 includes a vehicle state sensor that detects a state of the vehicle 1. The vehicle state sensor includes a speed sensor, an acceleration sensor, a yaw rate sensor, a steering angle sensor, and the like. In addition, the sensor group 20 includes a recognition sensor that recognizes (detects) a situation around the vehicle 1. Examples of the recognition sensor include a camera, a LIDAR (Laser Imaging Detection and Ranging), a radar, and the like. The sensor group 20 further includes a position sensor that detects a position and an orientation of the vehicle 1. The position sensor is exemplified by a GPS (Global Positioning System) sensor.

The communication device 30 communicates with the outside of the vehicle 1. For example, the communication device 30 communicates with the AVP management system 100.

The travel device 40 includes a steering device, a driving device, and a braking device. The steering device turns wheels. For example, the steering device includes an electric power steering (EPS) device. The driving device is a power source that generates a driving force. Examples of the drive device include an engine, an electric motor, an in-wheel motor, and the like. The braking device generates a braking force.

The control device (controller) 50 controls the vehicle 1. The control device 50 includes one or more processors 51 (hereinafter simply referred to as a processor 51) and one or more memory devices 52 (hereinafter simply referred to as a memory device 52). The processor 51 executes a variety of processing. For example, the processor 51 includes a CPU (Central Processing Unit). The memory device 52 stores a variety of information. Examples of the memory device 52 include a volatile memory, a non-volatile memory, an HDD (Hard Disk Drive), an SSD (Solid State Drive), and the like. The variety of processing by the processor 51 (the control device 50) is implemented by the processor 51 executing a control program being a computer program. The control program is stored in the memory device 52 or recorded on a non-transitory computer-readable recording medium. The control device 50 may include one or more ECUs (Electronic Control Units).

3-2. Driving Environment Information

The processor 51 uses the sensor group 20 to acquire driving environment information 70 indicating a driving environment for the vehicle 1. The driving environment information 70 is stored in the memory device 52.

Figure 13:
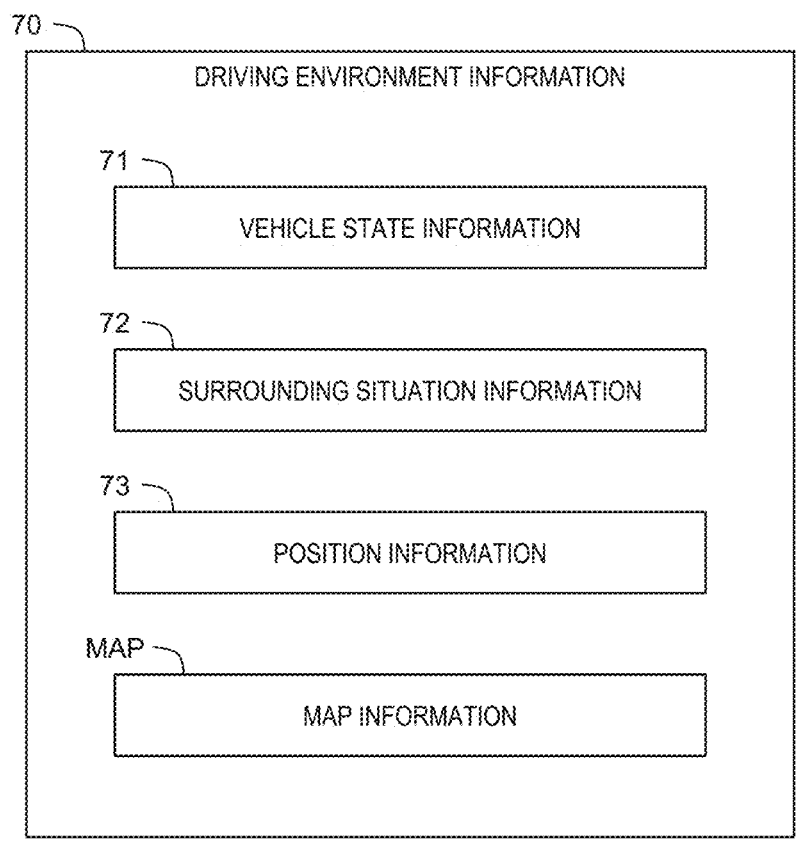
FIG. 13 is a block diagram showing an example of driving environment information according to an embodiment of the present disclosure.

FIG. 13 is a block diagram showing an example of the driving environment information 70. The driving environment information 70 includes vehicle state information 71, surrounding situation information 72, position information 73, and the map information MAP.

The vehicle state information 71 indicates the vehicle state (e.g., the vehicle speed, and the like) detected by the vehicle state sensor. The processor 51 acquires the vehicle state information 71 from the vehicle state sensor.

The surrounding situation information 72 indicates a result of recognition by the recognition sensor. For example, the surrounding situation information 72 includes an image captured by the camera. The surrounding situation information may include object information regarding an object around the vehicle 1. Examples of the object around the vehicle 1 include a pedestrian, another vehicle (e.g., a preceding vehicle, a parked vehicle, etc.), a sign, a white line, a roadside structure, and the like. The object information indicates a relative position and a relative velocity of the object with respect to the vehicle 1. The processor 51 acquires the surrounding situation information 72 based on the result of recognition by the recognition sensor.

The position information 73 is information indicating the position of the vehicle 1. The processor 51 acquires the position information 73 from a result of detection by the position sensor. Moreover, the processor 51 may acquire highly accurate position information 73 by a well-known localization process utilizing the surrounding situation information 72 and the map information MAP.

The map information MAP includes a general navigation map. Furthermore, the map information MAP includes arrangements of roads, the pick-up or drop-off points 2 (shared pick-up or drop-off areas), the parking facilities 3, landmarks, and the like in the service area AR. In addition, the map information MAP includes map information of an interior of each parking facility 3, that is, a layout of the parking space and the like. For example, the processor 51 acquires the map information MAP from an external system. The map information MAP may be provided by the AVP management system 100.

3-3. Communication Process

The processor 51 communicates with the AVP management system 100 via the communication device 30. The processor 51 periodically transmits at least a part of the driving environment information 70 to the AVP management system 100. For example, the processor 51 periodically transmits the position information 73 to the AVP management system 100. The processor 51 may transmit the surrounding situation information 72 to the AVP management system 100.

Moreover, the processor 51 receives the entry instruction and the exist instruction described above from the AVP management system 100 via the communication device 30. The entry instruction includes the information of the parking facility 3 which is a destination, and instructs to travel to the parking facility 3. The entry instruction may include a travel route to the parking facility 3. The exit instruction includes the information of the specified pick-up or drop-off point 2X which is a destination, and instructs to travel to the specified pick-up or drop-off point 2X. The exit instruction may include a travel route to the specified pick-up or drop-off point 2X.

3-4. Vehicle Travel Control and Automated Driving Control

The processor 51 executes "vehicle travel control" that controls travel of the vehicle 1. The vehicle travel control includes steering control, acceleration control, and deceleration control. The processor 51 executes the vehicle travel control by controlling the travel device 40 (the steering device, the driving device, and the braking device).

Furthermore, the processor 51 executes "automated driving control" that controls the automated driving of the vehicle 1 based on the driving environment information 70 described above. More specifically, the processor 51 generates a travel plan of the vehicle 1 based on the driving environment information 70. The travel plan includes a rough target path to the destination and a target action. Examples of the target action include maintaining a current travel lane, making a lane change, avoiding an obstacle, and so forth. Further, the processor 51 generates, based on the driving environment information 70, a target trajectory required for the vehicle 1 to travel in accordance with the travel plan. The target trajectory includes a target position and a target speed. Then, the processor 51 executes the above-described vehicle travel control such that the vehicle 1 follows the target trajectory.

In response to the entry instruction, the processor 51 executes the automated driving control such that the vehicle 1 travels to the parking facility 3 being the destination and enters the parking facility 3 (i.e., the entry process). Moreover, in response to the exit instruction, the processor 51 executes the automated driving control such that the vehicle 1 travels to the specified pick-up or drop-off point 2X being the destination (i.e., the exit process).

In the case of manual operation, the processor 51 executes the vehicle travel control according to a driving operation by the driver.

4. AVP Management System

4-1. Configuration Example

Figure 14:
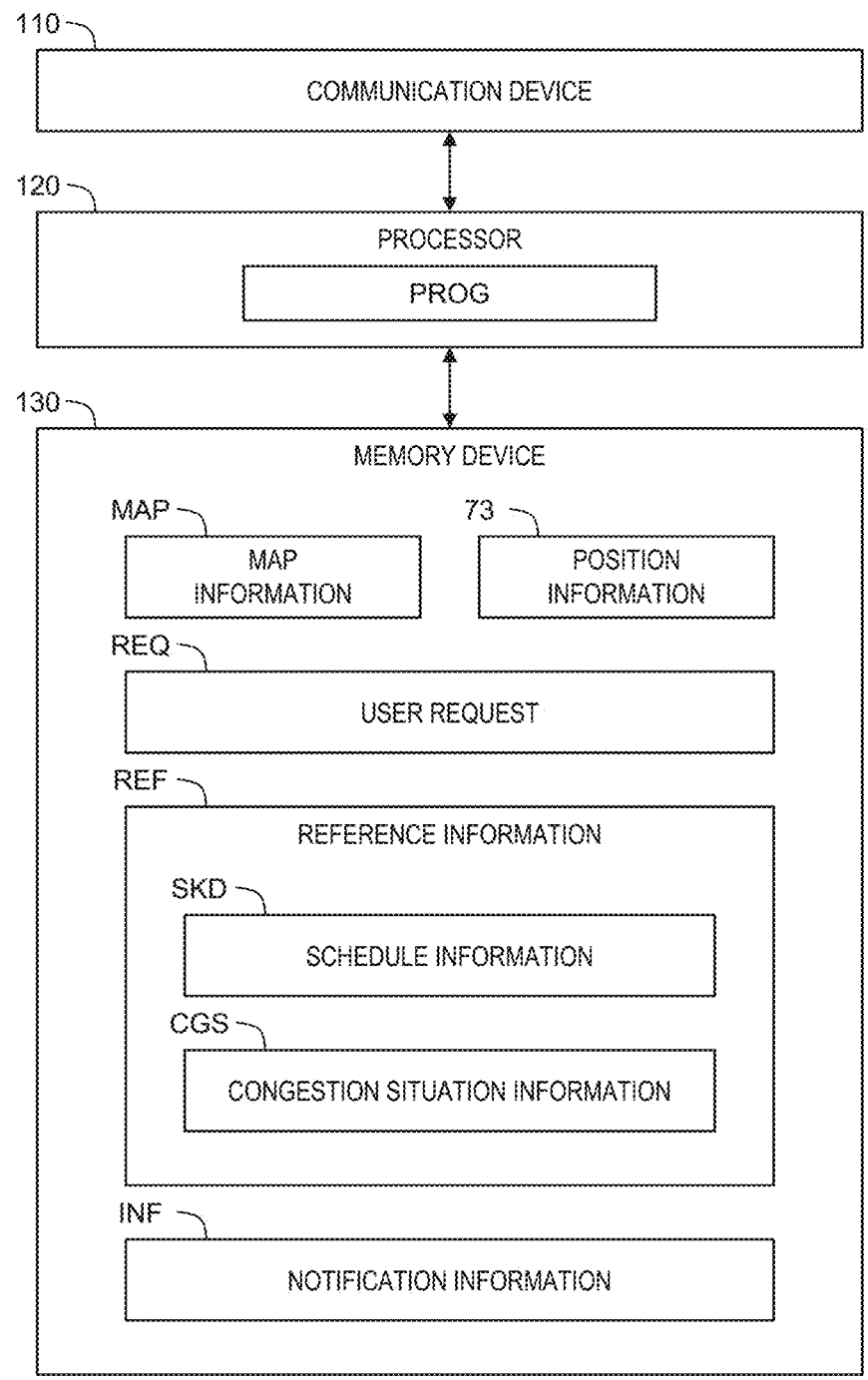
FIG. 14 is a block diagram showing a configuration example of an automated valet parking management system according to an embodiment of the present disclosure.

FIG. 14 is a block diagram showing a configuration example of the AVP management system 100 according to the present embodiment. The AVP management system 100 is, for example, a management server. The AVP management system 100 may be a distributed system. The AVP management system 100 includes a communication device 110, one or more processors 120 (hereinafter simply referred to as a processor 120) and one or more memory devices 130 (hereinafter simply referred to as a memory device 130).

The communication device 110 communicates with the outside. For example, the communication device 110 communicates with the user terminal 200. In addition, the communication device 110 communicates with the vehicle 1. Moreover, the communication device 110 communicates with the mobility 4. Furthermore, the communication device 110 communicates with the infrastructure camera 5.

The processor 120 executes a variety of processing. For example, the processor 120 includes a CPU. The function of the AVP management system 100 is implemented by the processor 120 executing an automated valet parking management program PROG being a computer program. The automated valet parking management program PROG is stored in the memory device 130. The automated valet parking management program PROG may be recorded on a non-transitory computer-readable recording medium. The automated valet parking management program PROG may be provided via a network.

The memory device 130 stores a variety of information. Examples of the memory device 130 include a volatile memory, a non-volatile memory, an HDD, an SSD, and the like.

The map information MAP indicates arrangements of roads, the pick-up or drop-off points 2 (shared pick-up or drop-off areas), the parking facilities 3, landmarks, and the like in the service area AR. In addition, the map information MAP includes map information of an interior of each parking facility 3, that is, a layout of the parking space and the like. The map information MAP is stored in the memory device 130 in advance.

4-2. Information Acquisition Process

The processor 120 communicates with the vehicle 1 via the communication device 110 and acquires the position information 73 transmitted from the vehicle 1. The position information 73 indicates the position of the vehicle 1. The position information 73 is stored in the memory device 130.

The processor 120 communicates with the user terminal 200 via the communication device 110 and acquires the user request REQ transmitted from the user terminal 200. The user request REQ includes at least the specified pick-up or drop-off point 2X that is specified (desired) by the user X. Furthermore, the user request REQ may include the specified date and time of use that is specified (desired) by the user X. The user request REQ may include the parking facility 3 that is specified (desired) by the user X. The user request REQ is stored in the memory device 130.

The processor 120 acquires the schedule information SKD indicating the schedule of the AVP service. For example, the schedule information SKD indicates the reservation status of the AVP service (see FIG. 3). The reservation status of the AVP service is obtained based on the user request REQ received from each user. The processor 120 generates and updates the schedule information SKD based on the user request REQ received from each user. Alternatively, the processor 120 may access the database DB managed by the calendar system to generate and update the schedule information SKD. The schedule information SKD may indicate a reservation status or a usage estimate of the AVP service for each pick-up or drop-off point 2 on a time-series basis (see FIG. 4). The reservation status of the AVP service for each pick-up or drop-off point 2 is obtained based on the user request REQ received from each user. The usage estimate of the AVP service for each pick-up or drop-off point 2 is obtained from past statistical information. The schedule information SKD is stored in the memory device 130.

Moreover, the processor 120 acquires the congestion situation information CGS indicating the congestion situation in the service area AR (see FIG. 5). Especially, the congestion situation information CGS indicates a congestion situation of moving bodies in the service area AR. Examples of the moving body include the vehicle 1, the mobility 4, human, and the like. For example, the processor 120 collects the position information 73 from the vehicle 1 via the communication device 110, and generates and updates the congestion situation information CGS based on the collected position information 73. As another example, the processor 120 may collect the surrounding situation information 72 (the image information) from the vehicle 1 via the communication device 110, and generate and update the congestion situation information CGS based on the collected image information. It is also possible to collect similar information from the mobility 4 as in the case of the vehicle 1 to generate and update the congestion situation information CGS. As yet another example, the processor 120 may collect the image information from the infrastructure cameras 5 via the communication device 110, and generate and update the congestion situation information CGS based on the collected image information. The congestion situation information CGS is stored in the memory device 130.

The reference information REF includes at least one of the schedule information SKD and the congestion situation information CGS.

4-3. Instruction Process

The processor 120 generates the exit instruction to the vehicle 1X based on the user request REQ and the map information MAP. The exit instruction includes information of the specified pick-up or drop-off point 2X which is the destination, and instructs the vehicle 1X to travel to the specified pick-up or drop-off point 2X. The exit instruction may include a travel route to the specified pick-up or drop-off point 2X. The processor 120 communicates with the vehicle 1X via the communication device 110 to transmit the exit instruction to the vehicle 1X.

Moreover, the processor 120 generates the entry instruction to the vehicle 1X based on the map information MAP. The entry instruction includes information of the parking facility 3 which is the destination, and instructs the vehicle 1X to travel to the parking facility 3. The entry instruction may include a travel route to the parking facility 3. The processor 120 communicates with the vehicle 1X via the communication device 110 to transmit the entry instruction to the vehicle 1X.

It should be noted that the processor 120 selects a parking facility 3 for parking the vehicle 1X from among a plurality of candidates. When the user request REQ indicates a parking facility 3 that is specified by the user X, the processor 120 may secure in advance the parking facility 3 specified by the user X. When the user request REQ indicates the specified date and time of use (i.e., the specified date and time of drop-off), the processor 120 may secure in advance an empty parking facility 3 in consideration of the specified date and time of use.

4-4. Information Delivery Process

The processor 120 executes the information delivery process that delivers information to the user X. More specifically, the processor 120 generates the notification information INF based on the reference information REF. Then, the processor 120 communicates with the user terminal 200 via the communication device 110 and transmits the notification information INF to the user terminal 200. The user terminal 200 has a display device and displays the received notification information INF on the display device. Thus, the notification information INF is notified to the user X.

4-4-1. First Example

Figure 15:
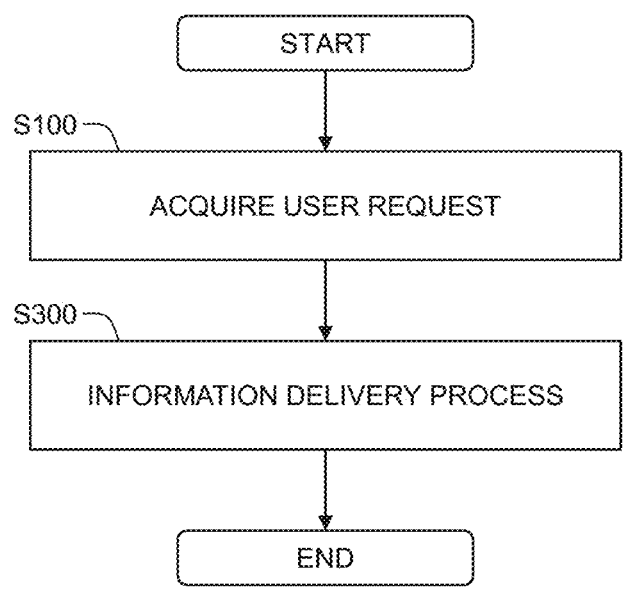
FIG. 15 is a flow chart showing a first example of processing related to an information delivery process according to an embodiment of the present disclosure.

FIG. 15 is a flow chart showing a first example of processing related to the information delivery process.

In Step S100, the processor 120 acquires the user request REQ from the user terminal 200 via the communication device 110.

In Step S300, the processor 120 executes the information delivery process based on the user request REQ and the reference information REF. Examples of the notification information INF include those described in the above Sections 2-2-3 and Section 2-2-4. The notification information INF includes at least one of information exemplified below:
(a) availability of the AVP service desired by the user X;
(b) a congestion situation on the travel route RT from the current position of the vehicle 1X to the specified pick-up or drop-off point 2X;
(c) a congestion situation at the specified pick-up or drop-off point 2X;
(d) a waiting time for the user X to get on the vehicle 1X or get off the vehicle 1X at the specified pick-up or drop-off point 2X;
(e) a recommended time of day of use at the specified pick-up or drop-off point 2X; and
(f) a substitute pick-up or drop-off point 2S being a substitute for the specified pick-up or drop-off point 2X.

4-4-2. Second Example

Figure 16:
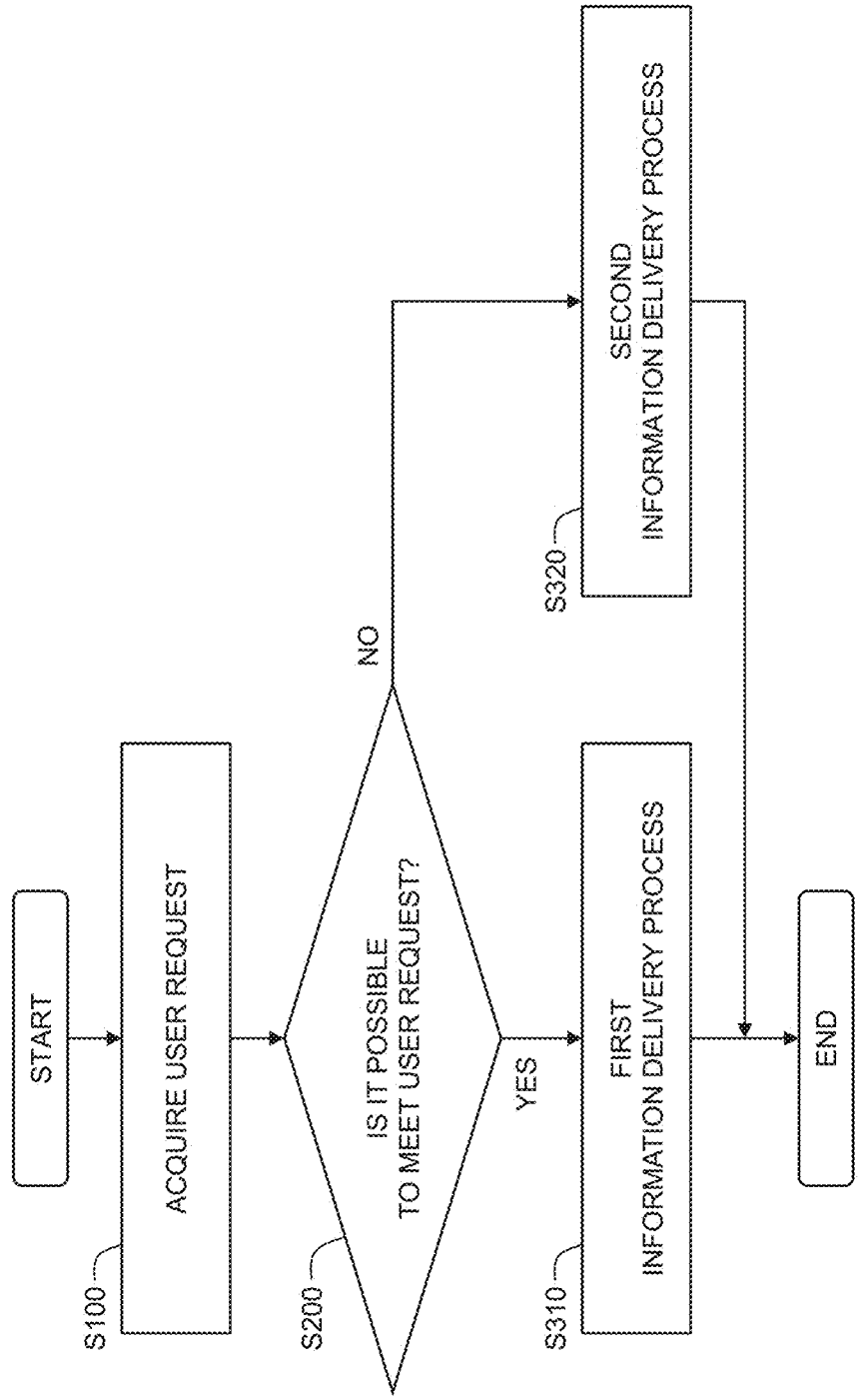
FIG. 16 is a flow chart showing a second example of processing related to an information delivery process according to an embodiment of the present disclosure.

FIG. 16 is a flow chart showing a second example of processing related to the information delivery process. Step S100 is the same as in the case of the first example.

In Step S200, the processor 120 executes the "determination process" that determines whether or not it is possible to deliver the AVP service to the user X in accordance with the user request REQ. The determination process is executed based on the reference information REF described above, that is, at least one of the schedule information SKD and the congestion situation information CGS.

For example, the congestion situation on the travel route RT can be grasped based on the congestion situation information CGS regarding the travel route RT. The processor 120 estimates an arrival time at which the vehicle 1X arrives at the specified pick-up or drop-off point 2X, based on the position information of the vehicle 1X, the specified pick-up or drop-off point 2X, the map information MAP, and the congestion situation information CGS. Then, the processor 120 performs the determination process by comparing the estimated arrival time and the specified date and time of use.

As another example, the congestion situation at the specified pick-up or drop-off point 2X can be grasped based on the schedule information SKD regarding the specified pick-up or drop-off point 2X or the congestion situation information CGS regarding the specified pick-up or drop-off point 2X. The processor 120 grasps the congestion situation at the specified pick-up or drop-off point 2X based on the referenced information REF. Further, based on the congestion situation at the specified pick-up or drop-off point 2X, the processor 120 estimates a pick-up/drop-off time at which the user X is able to get on the vehicle 1X or get off the vehicle 1X. Then, the AVP management system 100 performs the determination process by comparing the estimated pick-up/drop-off time and the specified date and time of use.

When it is possible to deliver the AVP service to the user X in accordance with the user request REQ, that is, when the result of the determination process is positive (Step S200; Yes), the processing proceeds to Step S310. On the other hand, when it is not possible to deliver the AVP service to the user X in accordance with the user request REQ, that is, when the result of the determination process is negative (Step S200; No), the processing proceeds to Step S320.

In Step S310, the processor 120 executes a first information delivery process. More specifically, the processor 120 generates notification information INF indicating that the AVP service desired by the user X is available. Then, the processor 120 communicates with the user terminal 200 via the communication device 110 and transmits the notification information INF to the user terminal 200.

In Step S320, the processor 120 executes a second information delivery process. The notification information INF in this case is the same as the notification information INF in the case of the above-described Step S300. The processor 120 communicates with the user terminal 200 via the communication device 110 and transmits the notification information INF to the user terminal 200.

Due to the information delivery process described above, the useful notification information INF with respect to the user request REQ is delivered to the user X. The user X receiving the notification information INF is able to consider changing the user request REQ and the like. That is, the user X is able to have more choices. Therefore, the convenience of the AVP service increases.

What is claimed is:
1. An automated valet parking management system that manages an automated valet parking service delivered in a predetermined area, wherein the predetermined area includes: a parking facility in which a vehicle supporting the automated valet parking service is parked; and a pick-up or drop-off point that is away from the parking facility and at which a user of the automated valet parking service gets on the vehicle or gets off the vehicle,
the automated valet parking management system comprising:
one or more processors; and
one or more memory devices storing reference information including at least one of:
schedule information indicating a schedule of the automated valet parking service; and
congestion situation information indicating a congestion situation in the predetermined area, wherein
the one or more processors are configured to execute:
acquiring a user request indicating a specified pick-up or drop-off point and a specified date and time of use that are specified by the user;
determining, based on the reference information, whether or not it is possible to deliver the automated valet parking service to the user in accordance with the user request; and
delivering notification information to the user based on the reference information, when it is not possible to deliver the automated valet parking service to the user in accordance with the user request, and the notification information includes at least one of:

the congestion situation on a route from a current position of the vehicle to the specified pick-up or drop-off point;

the congestion situation at the specified pick-up or drop-off point;

a waiting time for the user to get on the vehicle or get off the vehicle at the specified pick-up or drop-off point;

a recommended time of day of use at the specified pick-up or drop-off point; and a substitute pick-up or drop-off point being a substitute for the specified pick-up or drop-off point.

2. The automated valet parking management system according to claim 1, wherein the user request includes a specified drop-off point that is specified by the user, the reference information includes the congestion situation information, and the notification information includes at least one of:

the congestion situation on the route from the current position of the vehicle to the specified drop-off point; and a substitute drop-off point that is accessible by the vehicle with avoiding a congested area on the route.

3. An automated valet parking management system that manages an automated valet parking service delivered in a predetermined area, wherein the predetermined area includes: a parking facility in which a vehicle supporting the automated valet parking service is parked; and a drop-off point that is away from the parking facility and at which a user of the automated valet parking service gets off the vehicle, the automated valet parking management system comprising:

one or more processors; and one or more memory devices storing reference information including at least one of:

schedule information indicating a schedule of the automated valet parking service; and congestion situation information indicating a congestion situation in the predetermined area, wherein the one or more processors are configured to execute:

acquiring a user request indicating a specified drop-off point that is specified by the user; and delivering notification information to the user based on the reference information, and the notification information includes at least one of:

the congestion situation on a route from a current position of the vehicle to the specified drop-off point;

the congestion situation at the specified drop-off point;

a waiting time for the user to get off the vehicle at the specified drop-off point;

a recommended time of day of use at the specified drop-off point; and a substitute drop-off point being a substitute for the specified drop-off point.

4. The automated valet parking management system according to claim 3, wherein the reference information includes the congestion situation information, and the notification information includes at least one of:

the congestion situation on the route from the current position of the vehicle to the specified drop-off point; and the substitute drop-off point that is accessible by the vehicle with avoiding a congested area on the route.

5. An automated valet parking management method for managing an automated valet parking service delivered in a predetermined area, wherein the predetermined area includes: a parking facility in which a vehicle supporting the automated valet parking service is parked; and a pick-up or drop-off point that is away from the parking facility and at which a user of the automated valet parking service gets on the vehicle or gets off the vehicle, the automated valet parking management method being executed by a computer and comprising:

acquiring reference information including at least one of:

schedule information indicating a schedule of the automated valet parking service; and congestion situation information indicating a congestion situation in the predetermined area, acquiring a user request indicating a specified pick-up or drop-off point and a specified date and time of use that are specified by the user;

determining, based on the reference information, whether or not it is possible to deliver the automated valet parking service to the user in accordance with the user request; and delivering notification information to the user based on the reference information, when it is not possible to deliver the automated valet parking service to the user in accordance with the user request, wherein the notification information includes at least one of:

the congestion situation on a route from a current position of the vehicle to the specified pick-up or drop-off point;

the congestion situation at the specified pick-up or drop-off point;

a waiting time for the user to get on the vehicle or get off the vehicle at the specified pick-up or drop-off point;

a recommended time of day of use at the specified pick-up or drop-off point; and a substitute pick-up or drop-off point being a substitute for the specified pick-up or drop-off point.

* * * * *